R. ESNAULT-PELTERIE.
AEROPLANE.
APPLICATION FILED JAN. 16, 1908.

1,115,795.

Patented Nov. 3, 1914.
8 SHEETS—SHEET 3.

Witnesses.
Fred White
René Bruine

Inventor:
Robert Esnault-Pelterie,
By Attorneys

R. ESNAULT-PELTERIE.
AEROPLANE.
APPLICATION FILED JAN. 16, 1908.

1,115,795.

Patented Nov. 3, 1914.
8 SHEETS—SHEET 4.

WITNESSES:
Fred White
Rene Bruine

INVENTOR:
Robert Esnault-Pelterie,
By Attorneys,

# UNITED STATES PATENT OFFICE.

ROBERT ESNAULT-PELTERIE, OF BOULOGNE-SUR-SEINE, FRANCE.

AEROPLANE.

1,115,795.   Specification of Letters Patent.   Patented Nov. 3, 1914.

Application filed January 16, 1908. Serial No. 411,205.

*To all whom it may concern:*

Be it known that I, ROBERT ESNAULT-PELTERIE, a citizen of the Republic of France, residing at Boulogne-sur-Seine, Seine, France, have invented certain new and useful Improvements in Aeroplanes, of which the following is a specification.

The present invention has for its object a monoplan aeroplane with one or several pairs of wings which may be directed or distorted as desired, and provided with rudders or with a tail, the combination of such means having the effect of providing for the longitudinal and transverse stability as well as for the desired direction and ascent and descent of the machine.

A first embodiment of the invention comprises a single pair of distortable wings and steering rudders for the direction and ascent, the getting out of shape or distorting of the wings resulting in the obtaining of transverse stability and such distorting being obtained by means of subtended stay-wires suitably operated for pulling down simultaneously the fore portion of one wing and the aft portion of the other, or vice versa. The steering rudder is vertical and may be rotated about a vertical axis, while the rudder which steers the aeroplane upward or downward (called for convenience the "ascensional" rudder) and which is horizontal and is integral with the vertical rudder, may be rotated about a transverse horizontal axis in such a way as to secure the longitudinal stability of the machine and allow of the ascent and descent to be effected.

A second embodiment of the invention comprises a pair of distortable wings arranged in the same manner as in the previously described construction, and a single horizontal rudder or tail capable of pivoting about a horizontal longitudinal axis and also about a transverse horizontal axis. This last rudder or tail has the functions of the vertical and horizontal rudders previously described, and when pivoting about the longitudinal axis controls the direction of the machine, whereas, when pivoting about the transverse horizontal axis, it effects the ascent and descent of the machine or holds it level.

A third embodiment of the invention comprises two pairs of wings both distortable, but one of such pairs of wings is so mounted as to be capable of pivoting about a horizontal longitudinal axis like the tail or rudder of the previously described modification, with a view of so steering the machine in either direction.

All these various forms of the machine are formed with a fusiform body or girder of triangular or trapezoidal cross-sction inclosed in rims made of wood or any other light material, which are used for supporting a covering of cloth or other very light fabric permitting the slipping of the air molecules to reduce the resistance to the forward motion of the aeroplane. The cross-section is tapering toward the ends of the girder which is terminated with conical or pointed portions.

All these machines are provided with a propelling screw driven by a light power engine, such as an internal combustion engine, and the girder is carried, when running on the ground, by stems or legs provided at their ends with flexibly mounted wheels.

The construction and special features of the aeroplanes embodying this invention will be more clearly understood by the following description, reference being made to the accompanying drawings, in which:—

Figures 1 to 14 inclusive are diagrams for explaining the principles most clearly. The remaining figures are drawings of the actual constructions.

Figs. 1ª, 3ª, 7ª, 8ª and 9ª are respectively views of the constructions shown diagrammatically in Figs. 1, 3, 7, 8 and 9 respectively, and omitting the covering 9 shown in dotted lines in these figures.

Referring to the embodiments of the invention illustrated, the body or girder of the aeroplane is a structure indicated at 1 of approximately trapezoidal cross-section with its smaller side down, and framed up of a number of cross-panels connected together by four longitudinal cords or members 2, and terminated by trangular frames 3 at the fore and aft ends. From this girder the wings extend laterally. The propeller may be at the rear as in Fig. 1, or at the front as in Fig. 7, and the rudders are preferably placed at the rear, both the steering rudders (for horizontal direction) and the ascensional rudders (for vertical angle). The girder is surrounded by rings or other suitable frame-work for supporting the waterproof smooth cloth covering 9 which is preferably employed to entirely inclose the girder and to provide a prow at the forward end and a conical rear end so as to reduce the frictional resistance. The covering 9 is indicated merely in dotted lines to avoid obscuring the internal construction.

Figures 1, 2, 4, 5:
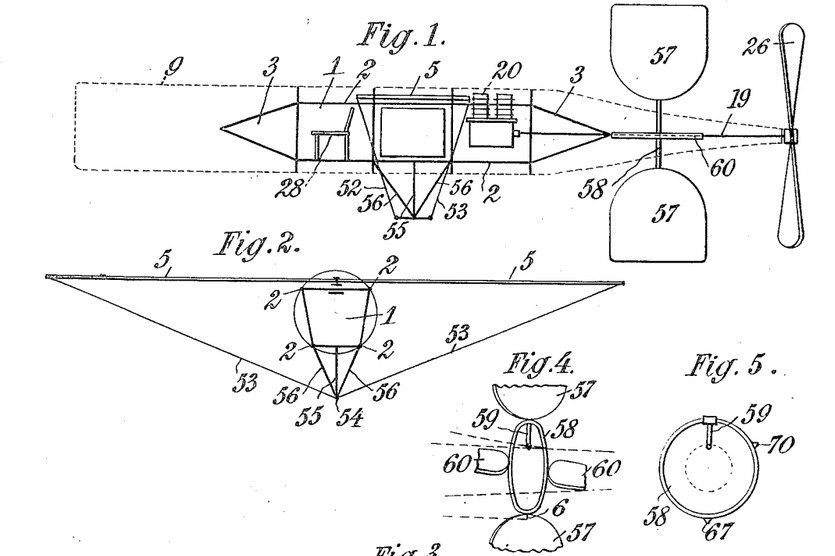
Figs. 1, 2 and 3 are respectively a longitudinal elevation, an end view, and a plan of an aeroplane embodying the invention.
Figs. 4 and 5 are respectively a perspective and an end view of the steering rudders and the ascensional rudders.
Figure 1A:
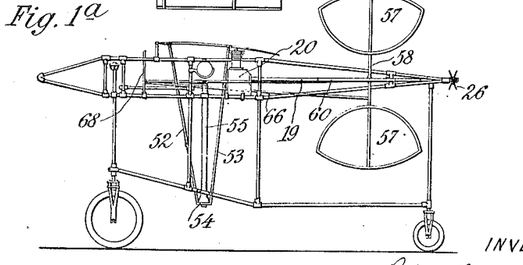
Figure 3:
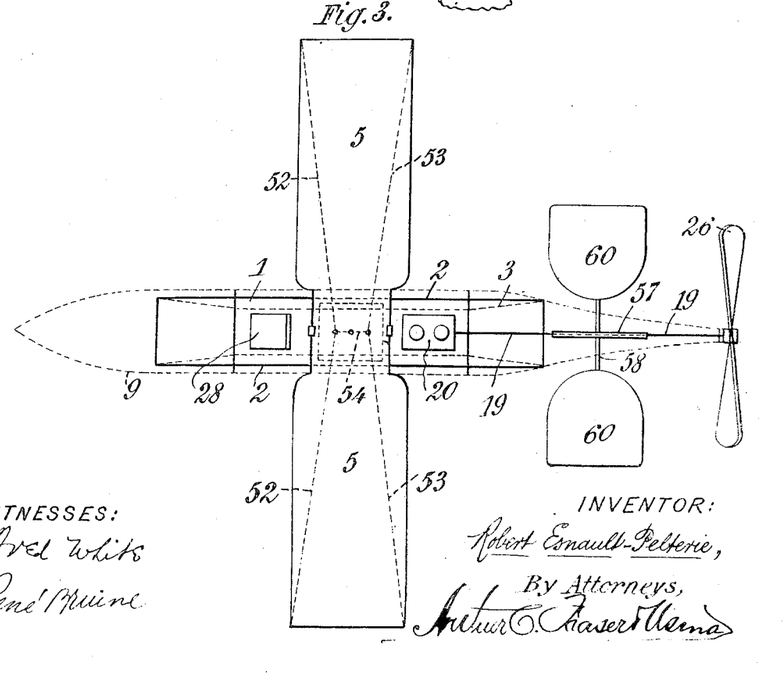
Figure 3A:
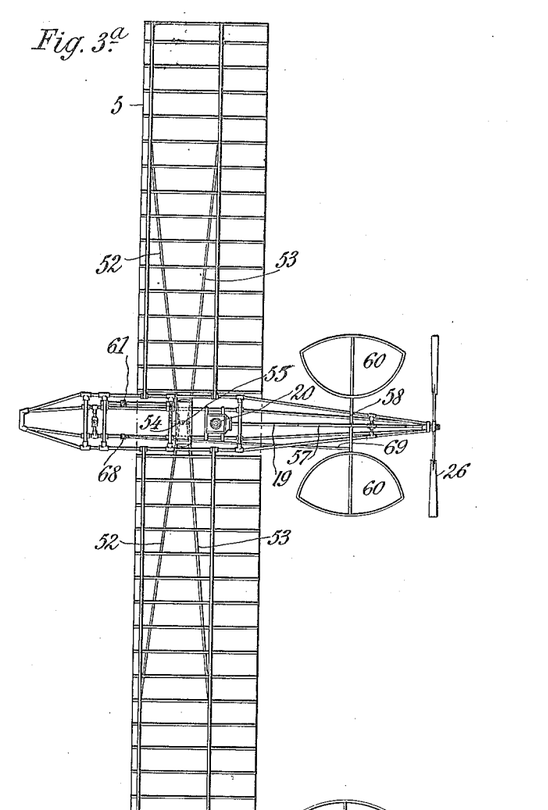

The two wings 5 of the aeroplane of Figs. 1, 2 and 3 are rigidly fixed to the center part of the top of the girder. These wings are constructed as hereinafter described to permit of their being radially distorted; the cloth which forms the sustaining surface being stretched on a yielding frame. The wings are connected by fore and aft stay-wires 52 and 53 respectively, extending from near their outer corners, to a small longitudinal bar 54 fixed at the lower end of a rod 55 which is braced at the bottom by four converging rods 56. The rod 55 is adapted to be oscillated so as to turn the longitudinal bar 54 to the right or to the left and thus to cause a tension on the front stay-wire 52 of one wing and on the rear stay-wire of the opposite wing simultaneously. Thus the front edge of one wing would be lowered at the same time as the rear edge of the other, which corresponds to a bending of one wing in one direction and the other in the opposite direction.

At 28 is indicated the seat of the pilot and at 20 the engine, both symmetrically located with reference to the center of gravity of the machine (where preferably the tank containing the combustible is located).

The engine 20 drives, through the horizontal shaft 19 properly supported in the girder, the propelling screw 26 mounted at the rear of the machine, but it will be understood that the position of the pilot and engine could be inverted with reference to the center of gravity, and that the screw could be mounted at the forward end.

Figure 19:
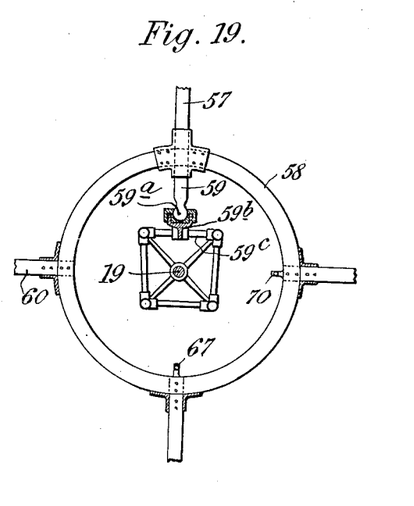
Fig. 19 is an enlarged end view of the same.

The directing rudder is composed of two vertical planes 57 attached to the diametral extremities of a ring 58 fixed to an arm 59 the lower end of which is provided with a ball 59ª mounted in a socket 59ᵇ upon a support, 59ᶜ, Fig. 19; at the horizontal diametral extremities of the ring 58, are also secured two horizontal planes 60 forming the ascensional rudder. It will be understood that if a pulling or pushing action is exerted on a lateral point of the ring 58, the latter and also the vertical planes of the directing rudder will turn about a vertical axis. On the other hand, if the lower extremities of the said ring are pulled or pushed, the latter, together with the ascensional planes, will be turned about a horizontal axis. Thus the directing rudder 57 can be set to the desired direction and the ascensional rudder 60 inclined as described, or both can be controlled both for the horizontal direction and for the ascent and descent of the machine.

Figure 6:
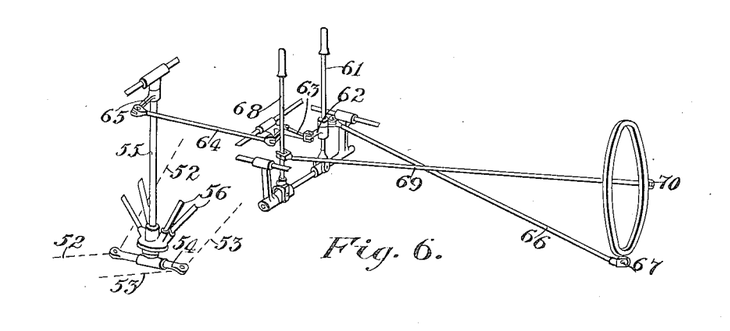
Fig. 6 is a diagram in perspective of the means for controlling the deformation and inclination of the rudders.

The distorting of the wings and the control of the inclination of the rudders can be performed in the following manner (Fig. 6):—To a vertical lever 61 mounted on a ball and socket and located, for example, on the right hand of the pilot, is connected, on the one hand, through an arm 62, an angle lever 63, a horizontal bar 64 which is hinged to the end of a horizontal arm 65 keyed at right angles on the vertical rod 55 operating the stay-wires. On the other hand the said lever 61 is connected through a rod 66 hinged thereto, to an attachment 67 on the lower end of the ring 58 (Figs. 4 and 5). It will now be seen that by moving the lever, either to the right or to the left, the rod 55 is induced, through this system of transmission, to rotate and thereby the wings are distorted, thus controlling the transverse stability. Moreover, by moving the said lever 61, forward or backward, the rod 66 will be pulled or pushed, and the rotation about an imaginary horizontal axis, that is, the forward or backward inclination of the ascensional rudder 60, will be obtained. Furthermore, by moving the said lever 61 in a direction intermediate the right or left and the front or back, the rod 55 and the rod 66 will be simultaneously affected, that is, the means for controlling the transverse stability and the means for controlling the longitudinal stability will be simultaneously actuated.

Another lever 68, symmetrically arranged with the lever 61 as regards the pilot seat, is again connected through the rod 69, to a lateral point 70 of the ring 58; thus by moving it fore or aft, the rotation about an imaginary vertical axis of the ring 58 and consequently of the directing rudder 57 will be effected.

Figure 7:
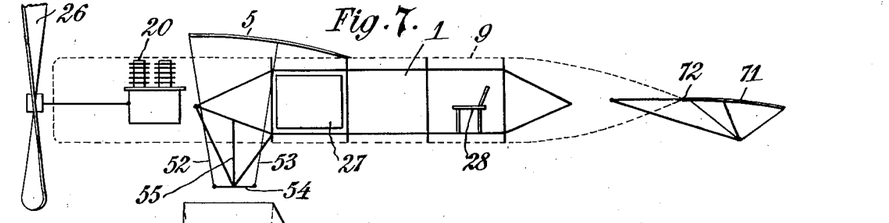
Figs. 7 and 8 are respectively a longitudinal elevation and a plan of another style of aeroplane embodying the invention.
Figure 7A:
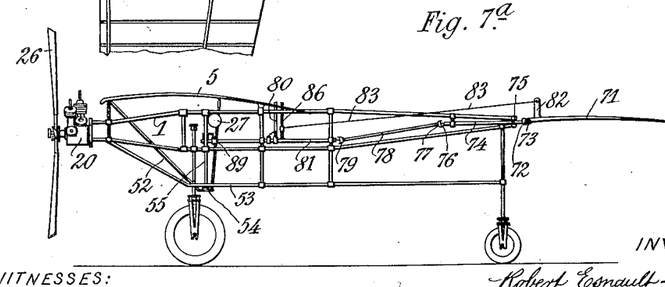
Figure 8:
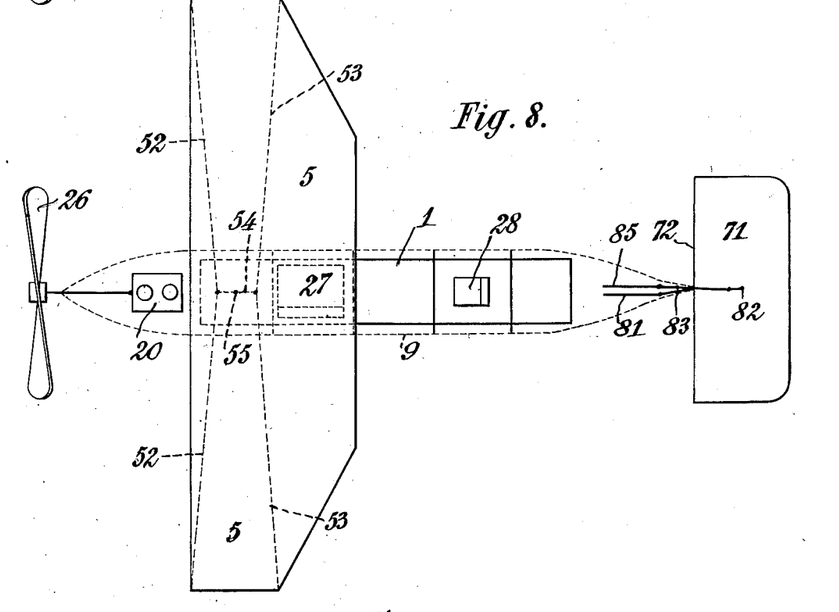
Figure 8A:
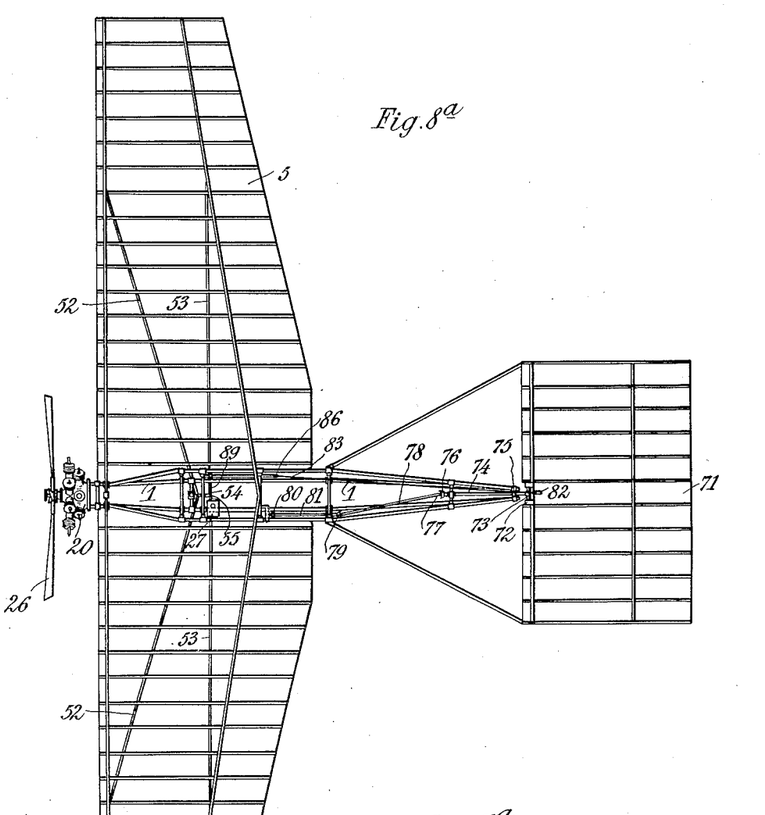

In the modification according to Figs. 7 and 8, on the front part of the girder is provided the pair of wings 5 having, when viewed in plan, the form shown in Fig. 8, and which may be slightly curved in longitudinal section (parallel to the girder) and have a concave surface. These wings are rigidly fixed on the girder in any suitable manner, and provided with warping mechanism as in Fig. 3.

In front of the wings is located the engine 20 which, through a horizontal longitudinal shaft properly mounted, drives the propelling screw 26 mounted at the forward end. In the middle of the girder 1 is the combustible fluid tank 27 so arranged that its center of gravity is on the vertical line of the center of gravity of the aeroplane. At the rear is the seat 28 of the pilot whose weight approximately balances the weight of the engine.

Figure 10:
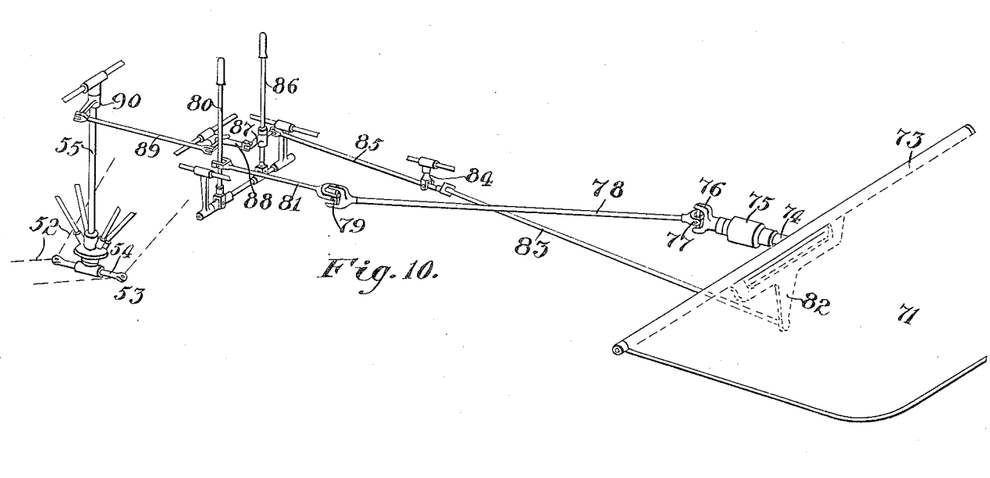
Fig. 10 is a diagram in perspective of the rudder controlling mechanism.
Figure 11:
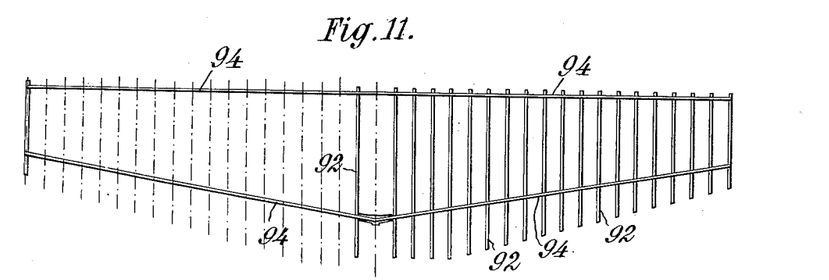
Fig. 11 is a plan of a wing.

At the rear part of the covering 9 is the double hinged rudder 71 formed with a horizontal plane or concave surface. The said rudder is so mounted that it can be turned about its longitudinal horizontal axis 72 which, for example, may be hollow and may engage a cylindrical fixed bar 73 used as a holder. To this bar 73 is connected an axis 74 (Fig. 10) mounted in a bearing 75 and fixed to the first fork 76 of a Cardan joint, the second fork 77 of which is connected, through a bar 78, to a second Cardan joint 79 which is itself connected to a vertical lever 80, through a longitudinal and horizontal bar 81. On the other hand, the hollow axis 72 of the rudder is secured to a vertical rod 82, connected through a rod 83 hinged to a small vertical arm 84, to a longitudinal bar 85 ending in another lever 86 placed symmetrically with the lever 80 with reference to the pilot's seat 28. On the one hand, it will be possible with the lever 80 which is moved either to the right or to the left, to cause the bar 81 and with it the bar 78 of the axis 74, to turn and thus to turn the rudder 71 about the said axis 74, and consequently to lower one side and raise the other. Such working has the effect of generating a horizontal power which causes the machine to turn and permits of steering horizontally. This is the way the birds and particularly the seagulls use their tails when they desire to turn. On the other hand, by moving the lever 86 forward or aft the rudder is caused to move about its axis 72, so as to lower or raise its front part. This is the way by which the longitudinal stability of the aeroplane will be controlled and the ascent or descent of the latter will be obtained. Moreover the lever 86 is connected, through a horizontal bar 87, to an angle lever 88, and a longitudinal bar 89 hinged to the said lever, with an arm 90 perpendicular to the rod 55 which, in turn is secured to the bar 54. When moved either to the right or to the left the lever 86 which is mounted on a ball and socket at its lower end, will cause the rod 55 and thereby the transverse bar 54 to turn, which will have the effect of distorting the front pair of wings.

The lever 86 is, furthermore, adapted to simultaneously actuate the rod 55 and the rod 85 in a manner similar to that described above in relation to the lever 61, Fig. 6.

Figure 9:
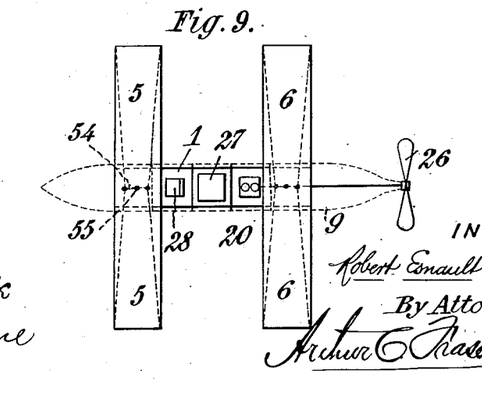
Fig. 9 is a plan of still another style.
Figure 9A:
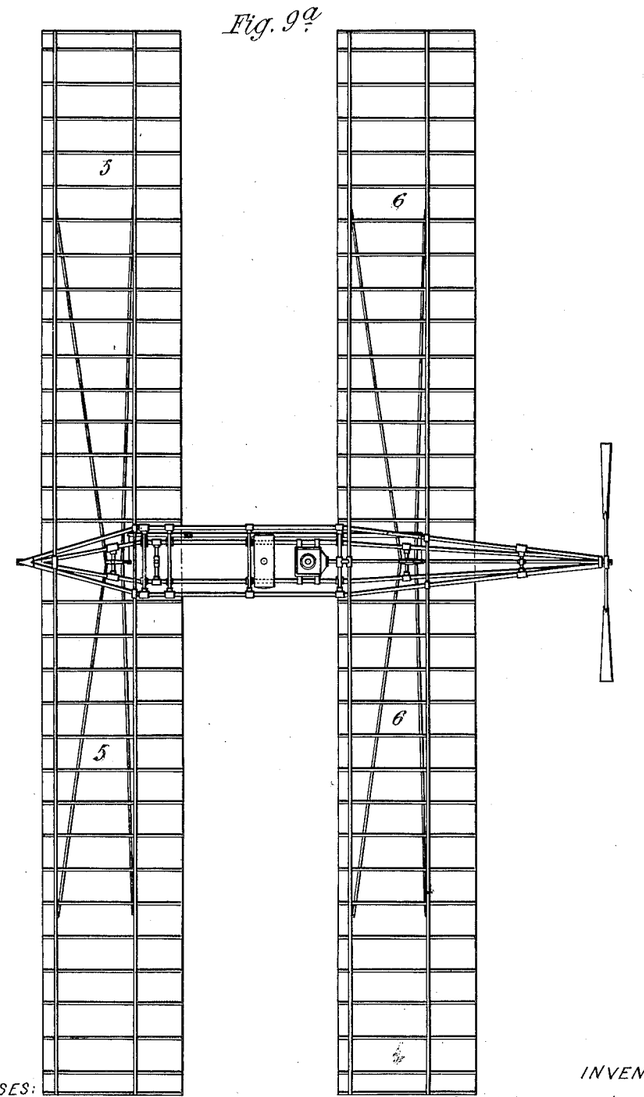

The aeroplane illustrated in Figs. 9 and 9ª comprises two pairs of wings 5 and 6 mounted on a braced girder inclosed in a suitable covering.

This aeroplane is characterized by the fact that the two fore and aft pairs of wings are distortable and may be effected the same as in the previously described constructions, or in any other suitable way.

Figure 12:
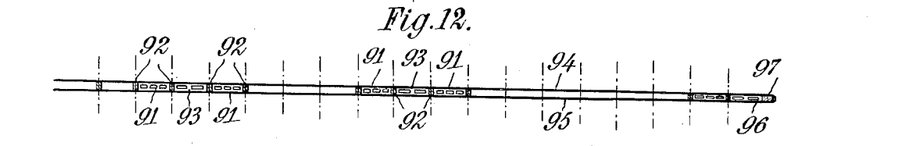
Fig. 12 is a cross-section of the same.
Figures 13, 15:
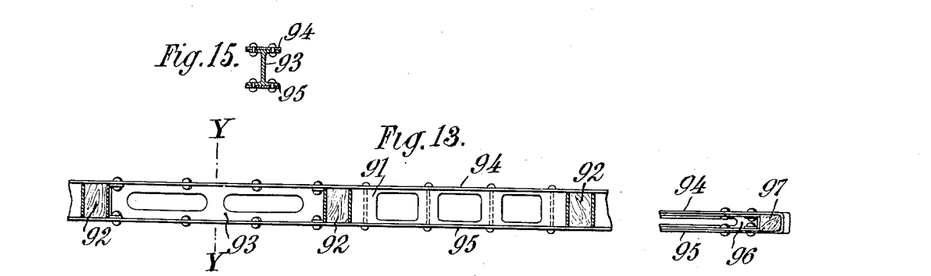
Figs. 13 and 14 are a cross-section and a plan view of a portion of the same on a larger scale.
Fig. 15 is a cross-section on the line Y—Y of Figs. 13 and 14.
Figure 14:
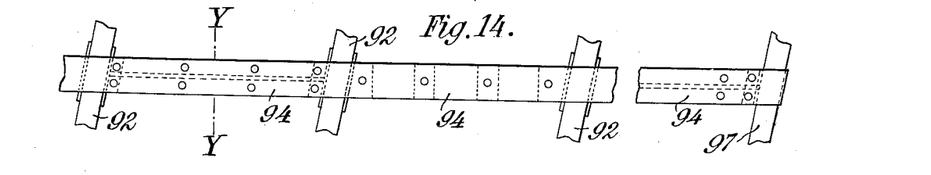
Figure 16:
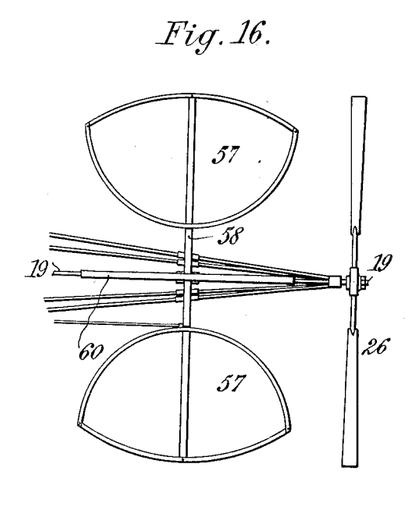
Figs. 16, 17 and 18 are a side elevation, plan and end view respectively, of the rear end of the aeroplane.
Figure 17:
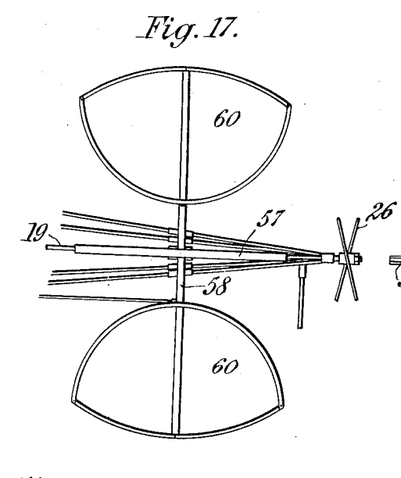
Figure 18:
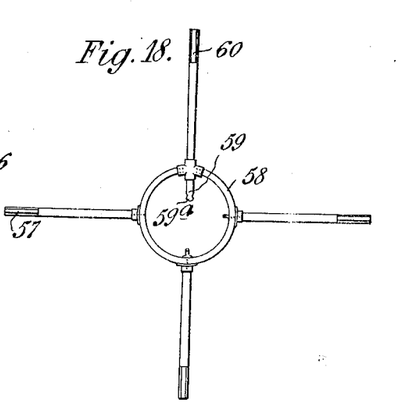

The system of framing for aeroplane wings which will now be described with reference to Figs. 11, 12, 13, 14 and 15 answers these two indispensable conditions, viz: the utmost lightness and great rigidity. The beam illustrated in Fig. 12 is made of a number of cut-out wooden webs 91 between which are left suitable spaces for passing therethrough the ribs 92; at the parts where the direction changes these wooden webs are replaced by very thin double T-shaped metal pieces 93 of steel or aluminum, also suitably cut out. These various members 91 and 93 are connected together by two upper and lower flanges 94 and 95 properly riveted to the metal pieces 93 as well as to the wooden pieces 91. Where the ribs are passed through are arranged aluminum flanges so as to guide them properly. The end of the girder is also made of a double T-shaped member 96 of aluminum or very light steel, so as to strengthen the end of the girder, and a passage is suitably provided for the outermost rib 97. It will thus be noted that a very light and sufficiently rigid beam will be obtained, thanks to the metal flanges and to the metal pieces which are located at the point where the curve changes.

What I claim is:—

1. An aeroplane having a pair of distortable wings rigidly attached to the body, stays connected to the front and back outer portions of the wings, a vertical rod carried by the body of the aeroplane and having its lower end connected to the inner ends of said stays, said rod being rotatable to pull the front stay of one wing simultaneously with the rear stay of the opposite wing, or vice versa, to maintain the transverse stability of the aeroplane.

2. An aeroplane having distortable wings for maintaining transverse stability, a rudder for maintaining longitudinal stability, a lever controlling said wings and said rudder, a steering rudder, and a separate lever controlling said steering rudder.

3. An aeroplane having a wing including a beam consisting of a number of wooden members, said beam having spaces therethrough, and ribs passing through said spaces and united together by upper and lower flanges extending substantially the length of the beam.

4. An aeroplane having a wing including a beam consisting of a number of wooden members, said beam having spaces therethrough, and ribs passing through said spaces and united together by upper and lower flanges extending substantially the length of the beam, said wooden members being replaced by metal members at the point where the direction changes.

5. In an aeroplane, the combination of means for producing lateral stability, means for producing longitudinal stability, and a single vertical lever movable in every direction for operating both said means for producing lateral stability and said means for producing longitudinal stability.

6. In an aeroplane, the combination of means for producing lateral stability, means for producing longitudinal stability, means for steering in a horizontal plane, a single vertical lever movable in every direction for operating both said means for producing lateral stability and said means for producing longitudinal stability, and separate means for operating said steering means.

7. In an aeroplane, the combination of means for producing lateral stability, means for producing longitudinal stability, and a single vertical lever movable in every direction for operating both said means for producing lateral stability and said means for producing longitudinal stability, said single lever being operable by reflex movements of the body of an aviator to restore said aeroplane to an even keel when it departs therefrom in either a lateral or longitudinal direction.

8. In an aeroplane, the combination of means for producing lateral stability, means for producing longitudinal stability, and a single vertical lever movable in every direction operating upon both said means for producing lateral stability and said means for producing longitudinal stability, said lever, upon forward movement thereof, operating said means for producing longitudinal stability to direct the aeroplane downwardly, said lever, upon rearward movement thereof, operating said means for producing longitudinal stability to elevate the aeroplane, said lever, upon movement thereof to the right and left, operating said means for producing lateral stability to raise the aeroplane on the left and right respectively.

9. In an aeroplane, the combination of means for producing lateral stability, means for producing longitudinal stability and a single vertical lever for operating both said means for producing lateral stability and said means for producing longitudinal stability, said lever being mounted upon an universal joint and being oscillatable in every direction.

In witness whereof I have hereunto set my hand in presence of two witnesses.

ROBERT ESNAULT-PELTERIE.

Witnesses:
 MARCEL ARMENGAUD, Jeune.
 DEAN M. MASON.